United States Patent [19]

Hummel et al.

[11] Patent Number: 5,535,858
[45] Date of Patent: * Jul. 16, 1996

[54] BRAKE FRICTION PAD ASSEMBLY

[75] Inventors: Alan R. Hummel, Winchester; John P. Kwolek, Cross Junction, both of Va.

[73] Assignee: Wagner Electric Corporation, Houston, Tex.

[ * ] Notice: The term of this patent shall not extend beyond the expiration date of Pat. No. 5,480,008.

[21] Appl. No.: 494,893

[22] Filed: Jun. 26, 1995

Related U.S. Application Data

[62] Division of Ser. No. 216,356, Mar. 23, 1994, Pat. No. 5,480,008.

[51] Int. Cl.$^6$ .................................................. F16D 69/00
[52] U.S. Cl. ................................. 188/250 B; 188/73.37; 188/250 G
[58] Field of Search .............................. 188/73.37, 73.1, 188/250 B, 250 E, 250 G, 251 A, 251 M, 251 R, 264 G; 156/91, 92

[56] References Cited

U.S. PATENT DOCUMENTS

| | | | |
|---|---|---|---|
| 2,581,926 | 1/1952 | Groten et al. | 188/250 G |
| 2,943,712 | 7/1960 | Curtiss et al. | 188/250 B |
| 3,684,062 | 8/1972 | Johnson | 188/251 R |
| 4,778,548 | 10/1988 | Fox et al. | 188/251 A |
| 5,139,114 | 8/1992 | Rodriguez et al. | 188/250 G |
| 5,261,512 | 11/1993 | Young | 188/250 G |
| 5,396,972 | 3/1995 | Grele | 188/250 B |

FOREIGN PATENT DOCUMENTS

| | | | |
|---|---|---|---|
| 0093527 | 4/1987 | Japan | 188/250 B |
| 0415381 | 3/1991 | Japan | 188/250 B |

Primary Examiner—Robert J. Oberleitner
Assistant Examiner—Chris Schwartz
Attorney, Agent, or Firm—Thomas S. Baker, Jr.

[57] ABSTRACT

A brake friction pad assembly is provided with a metallic backing plate element, a friction pad element having a mating surface, an air-dried and completely thermally cured elastomeric adhesive material film joined in cure-bonded relation to the mating surface of the friction pad element, and mechanical fasteners joining the friction pad element and adhered elastomeric adhesive material film to the backing plate element with the elastomeric adhesive material film in an intermediate position.

2 Claims, 1 Drawing Sheet

BRAKE FRICTION PAD ASSEMBLY

This is a division of application Ser. No. 08/216,356 filed Mar. 23, 1994, U.S. Pat. No. 5,480,008.

FIELD OF THE INVENTION

This invention relates generally to brake systems of the type used in domestic road vehicles, and particularly concerns an improved brake friction pad assembly having an elastomeric noise-damping material incorporated into the assembly only after complete material thermal curing.

BACKGROUND OF THE INVENTION

Various elastomeric materials have been knowingly incorporated into vehicular brake friction pad assemblies for the purpose of reducing the squeal-type noise that often is otherwise generated in the incorporating brake system during vehicle braking. Other elastomeric materials in such assemblies have been used as adhesives to bond brake friction pad elements to a metallic backing plate.

None of the prior art brake assembly teachings disclose or suggest that improved brake assembly squeal and other noise reductions can be realized if an elastomeric adhesive film applied to the brake friction material pad is completely thermally cured prior to subsequent assembly of the friction material pad to its backing member, and that the subsequent assembly be accomplished not by relying on the adhesive strength of the elastomeric film but by using mechanical fasteners instead.

SUMMARY OF THE INVENTION

The present invention, which may be utilized in either disc brake or drum brake applications, involves the sequential steps of applying a uniform thin film of elastomeric adhesive to the mating surface of a brake friction pad element, air-drying the elastomeric adhesive film to remove entrained solvent-like constituents, heating the friction pad element and elastomeric film at an elevated temperature in the range of 350 to 400 degrees Fahrenheit for a sufficient time to thermally cure the elastomeric adhesive film, and, after cooling, joining the friction pad element and cured film to the mating surface of the assembly backing plate element with either rivets, threaded fasteners, or the like.

DETAILED DESCRIPTION

Figure 1:
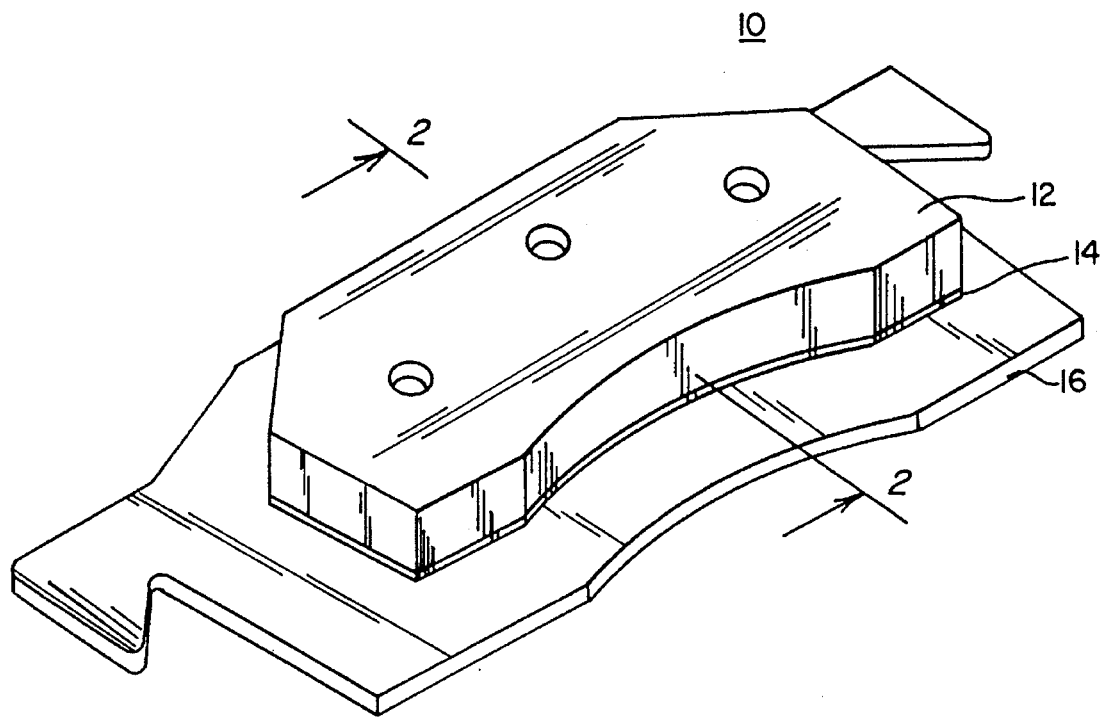
FIG. 1 is a perspective view of a preferred embodiment of the improved brake friction pad assembly of our invention.
Figure 2:
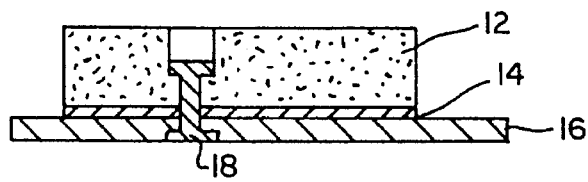
FIG. 2 is a view along line 2—2 of FIG. 1.

In FIGS. 1 and 2 we illustrate a disc brake friction pad assembly (10) comprised of a molded friction pad element (12), a thermally cured elastomeric adhesive film (14) adhered to the mating surface of element (12), a metal backing plate element (16) for mounting the assembly in a cooperating vehicle brake system, and rivet fasteners (18) utilized to mechanically join friction pad element (12) to backing plate element (16) with film (14) being located in an intermediate position.

Friction pad element (12) in the preferred embodiment is molded of a semi-metallic friction-generating material. A typical composition for such material is comprised of a mixture of 57 parts metallic particles such as iron powder and steel wool fiber particles, 12 parts straight or modified phenolic resin binder particles, 21 parts carbonaceous particles such as graphite particles or coke particles, 5 parts filler particles such as barytes particles, 4 parts abrasive particles such as magnesia or alumina particles, and 1 part friction particles such as rubber peel particles, all parts proportions being on a percentage volume basis. The friction-generating material mixture, with an included curative for the resin binder particles, normally is compressed in a pre-heated mold to an isostatic pressure as high as approximately 6000 pounds per square inch. After compaction, the friction pad is thermally cured by slow linear heating to a temperature of approximately 400 degrees Fahrenheit and maintained at that temperature for up to 24 hours to complete the thermal curing cycle.

After cooling, the cured friction pad element (12) is provided with a thin film of an elastomeric adhesive (14) such as the commercially-available synthetic rubber elastomeric adhesives marketed in the United States under the names "Cycle Weld" and "Plastilock" by B. F. Goodrich Company of Akron, Ohio. We prefer that the film be distributed evenly over element (12) and that it have a thickness that will result in a finally-cured thickness of from approximately 0.003 inch to approximately 0.015 inch. Following application of the elastomeric adhesive film to cured friction pad assembly (12) the film is air-dried or oven dried for up to 24 hours to remove entrained volatile constituents and then subjected to thermal curing. Thermal curing normally involves heating the air-dried film and the friction pad element combination to a temperature in the range of approximately from 350 degrees Fahrenheit to 400 degrees Fahrenheit for a period of from ¼ hour to 3 hours. After subsequent cooling the friction pad/elastomeric film combination is readied for assembly to metal backing plate element (16).

Lastly, we preferably assemble element (12) and its elastomeric film (14) to element (16) by means of mechanical fasteners such as rivets (18) as shown in FIG. 1. Other mechanical fasteners such as threaded bolts and the like may be substituted for rivets (18). It should be noted that the substitution of a further adhesive for fasteners (18) is not acceptable if the noise and squeal reduction advantages of our invention are to be realized.

Other friction-generating material compositions, elastomeric adhesive compositions, and component shapes and sizes may be utilized in the practice of our claimed invention.

We claim our invention as follows:

1. In a method of manufacturing a brake friction pad assembly having a metallic backing plate element and a friction pad element, the steps comprising:

forming a friction pad element of a molded friction-generating particulate material and with a mating surface;

applying a uniformly thin coating of a thermo-setting elastomeric adhesive material over said friction pad element mating surface;

air-drying said thin coating of elastomeric adhesive material a sufficient time to remove any contained volatile constituents;

heating the air-dried thin elastomeric adhesive material coating at an elevated temperature in the range of approximately 350 degrees Fahrenheit to 400 degrees Fahrenheit a sufficient time to completely thermally cure said elastomeric adhesive material in bonded relation to said friction pad element but not to said backing plate element; and subsequently mechanically joining said friction pad element having said thermally cured elastomeric adhesive material coating to a metallic backing plate element with said thermally cured coating in an intermediate position.

2. The method defined by claim 1 wherein said air-dried thin elastomeric material coating is heated to a temperature in the range of approximately from 350 degrees Fahrenheit to 400 degrees Fahrenheit for a period of time in the range of approximately from ¼ hour to 3 hours.

* * * * *